(No Model.)   2 Sheets—Sheet 1.

J. CURRIER & F. ELLIS.
CARRIAGE.

No. 492,461.   Patented Feb. 28, 1893.

WITNESSES.   INVENTORS.

(No Model.) 2 Sheets—Sheet 2.

J. CURRIER & F. ELLIS.
CARRIAGE.

No. 492,461. Patented Feb. 28, 1893.

WITNESSES.
L. H. Smith.
B. W. Williams.

INVENTORS.
John Currier
Frederick Ellis
By their Att'y
Henry Williams

THE NORRIS PETERS CO., PHOTO-LITHO., WASHINGTON, D. C.

UNITED STATES PATENT OFFICE.

JOHN CURRIER AND FREDERICK ELLIS, OF AMESBURY, MASSACHUSETTS.

CARRIAGE.

SPECIFICATION forming part of Letters Patent No. 492,461, dated February 28, 1893.

Application filed May 2, 1892. Serial No. 431,457. (No model.)

*To all whom it may concern:*

Be it known that we, JOHN CURRIER and FREDERICK ELLIS, citizens of the United States, residing at Amesbury, in the county of Essex and State of Massachusetts, have invented new and useful Improvements in Carriages, of which the following is a specification.

This invention relates to two-seated carriages i. e., carriages having a front and rear seat, and particularly to that class of carriages in which one of the seats is divided longitudinally with the carriage so as to make two half seats, each independent of the other; and the invention consists in the novel construction and arrangement of parts hereinafter described whereby each half seat may be swung outwardly over the rail and returned to its original position, so that entrance may be had to the other seat.

We prefer to apply our invention to the front seat of a carriage, so that the front seat is composed of two half seats and the rear seat is made integral, but we propose to apply it to either seat as desired, making, if it is deemed advisable, the rear seat in halves and the front seat a whole or integral seat.

Figure 1:
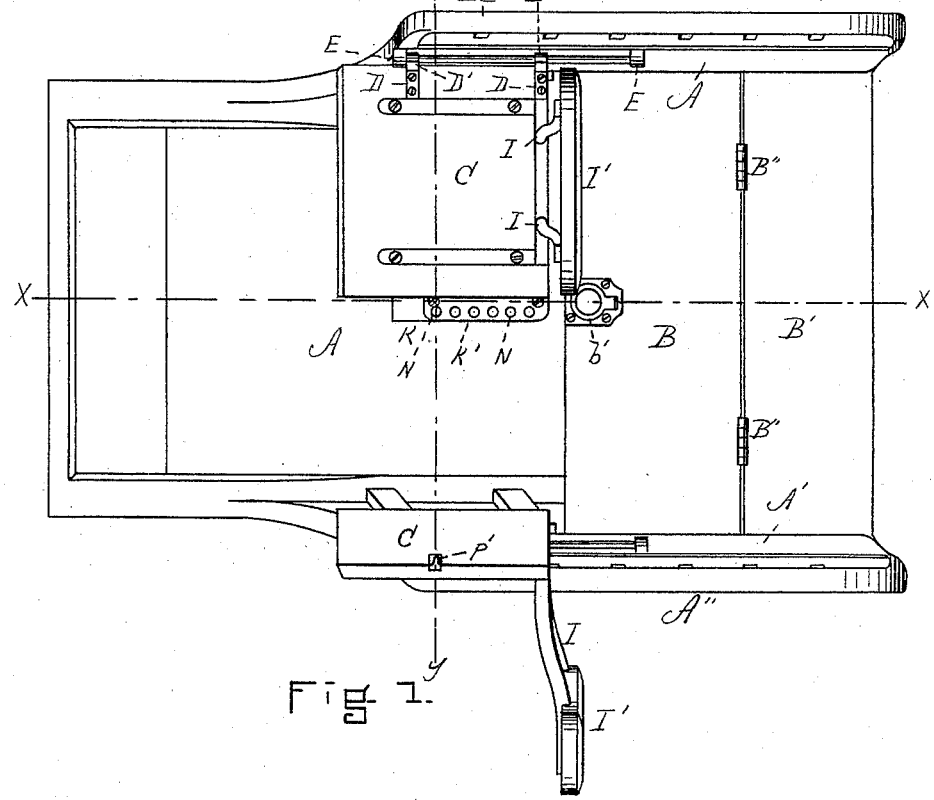
Figure 2:
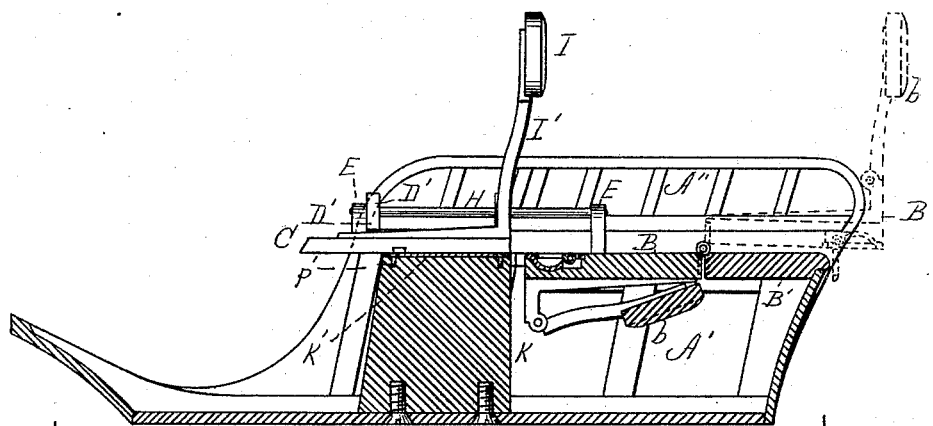
Figure 3:
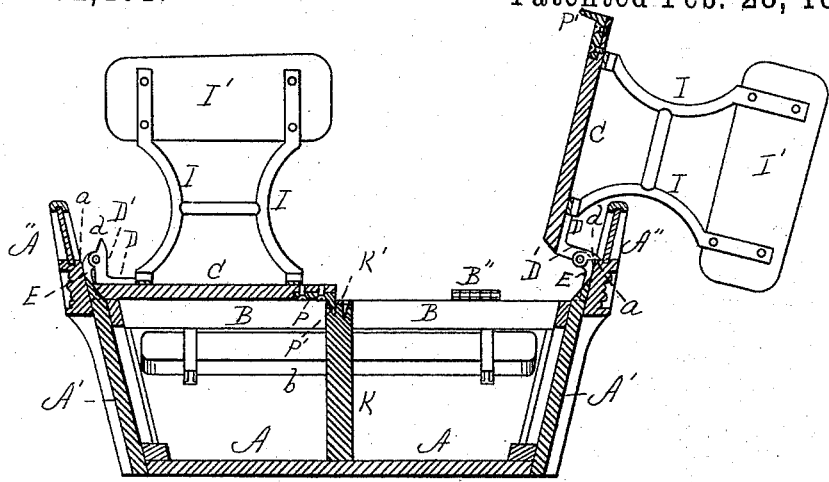
Figure 4:
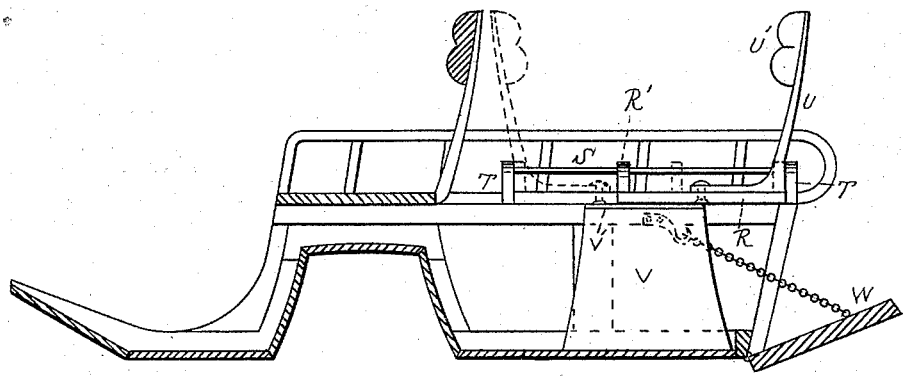

In the accompanying drawings, in which similar letters of reference indicate like parts; Figure 1 is a plan view of a carriage-body embodying our invention, the front seat being made in halves and one of said halves swung over the rail. In this figure the rear seat is swung down out of sight leaving merely a deck in view. Fig. 2. is a longitudinal vertical section on line x Fig. 1, the position of the rear seat when raised being shown in broken lines. Fig. 3. is a transverse vertical section on line y, Fig. 1. Fig. 4. is a central longitudinal vertical section with our invention applied to the rear seat instead of the front seat.

In Figs. 1, 2 and 3, A represents the floor, A' the side panels and A'' the side rails of the carriage-body.

B is the rear seat provided with the hinged lazy-back b, said rear seat being hinged at B'' to the deck B'. This rear seat when lowered constitutes a portion of the deck, as shown in full lines in Figs. 1 and 2, and the lazy-back swings below the seat. The seat is raised into the position shown in broken lines in Fig. 2, by pulling up on the hinged loop or catch b' which when not in use lies down flush with the surface of the seat. The construction and arrangement of this rear seat is not new and needs no further description; and we do not confine ourselves to this construction as it makes no part of the invention.

The front seat is made in two halves, as shown, each half consisting of the seat-portion C to which is rigidly secured at its outer edge, angle-brackets or hinges, each of which consists of the horizontal portion D screwed to the seat and the vertical portion D' provided with a horizontal perforation.

Secured to the inner side of each side panel, next the outer edge of each half seat, is a pair of brackets E provided with horizontal perforations. A horizontal round rod H extends from one to the other of these brackets E on each side, and is supported thereby, and extends through the perforations in the vertical portions D' of the angle-brackets which are secured to the half seat, thus forming a fulcrum or pivot upon which said half seat turns. The supporting irons I of the back I' of each half seat are bent or curved inward toward each other, as shown, so that the outer of these supporting irons, at least, presents a decided concavity in order that when the half seat is swung outward said irons will not strike the rail A''. The vertical portions D' of the angle-brackets are provided with projections or stops d made of suitable shape to rest on the ledge a which is on the inner side of the rail A''. When admission is desired to the rear seat, therefore, one of the front half seats C is swung up sidewise on the rod H until the projections or stops d rest on the ledge a, as shown in Figs. 1 and 3; and as will be seen in Fig. 3, the inward curve or concavity of the outer edge of the seat-back-irons I enable them to clear the rail A'' so that the seat can be hinged to the body inside the rail.

Centrally located beneath the inner edges of the half seats C is a partition K. This partition is provided on its upper edge with a plate K', such plate being furnished with two parallel rows of perforations N which extend longitudinally with the partition and carriage-body. The upper edge of the partition is bored coincidently with these perforations. The under side of each half seat is provided next its inner edge with a metallic plate P from which a prong P' extends downward.

When the half seats are in position for occupancy their inner edges rest upon the plate K' on the partition K and their prongs P' extend downward into two of the perforations N. When the front seat only of the carriage is to be used these half seats may be slid back on the rods H and the prongs dropped into a rear pair of the perforations N, so that the rear edges of the half seats C may overlap the front edge of the rear seat B, which is then used simply as a deck. When the rear seat is to be used, the front half seats are slid forward on the rods H and the prongs P' inserted in forward perforations K', as in Fig. 2, so that the rear seat B can be swung up from its position as a deck into its position as a seat.

Admission to the rear seat is had by swinging up one of the front half seats in the manner above described.

In the modification shown in Fig. 4, the front seat is a whole seat and stationary, and the rear seat comprises two half seats constructed in accordance with the principles of our invention. In this figure the rear half seats R are provided with angle brackets R' exactly similar to the brackets D D' d, which slide and are hinged on rods S whose ends are supported by brackets T secured to the body inside the rails. The irons U which support the seat-backs U' are curved inwardly exactly like the irons I, and a partition V is constructed exactly like the partition K, and is provided with a perforated plate V' similar to the perforated plate K', into the perforations in which prongs secured to the under sides of the half seats R extend.

In order that access may be had to one of the rear seats, the other is swung outwardly sidewise and the tail-gate W, which is hinged for the purpose, is dropped as shown.

Having thus fully described our invention, what we claim, and desire to secure by Letters Patent, is—

1. As an improvement in hinged vehicle seats, the combination of the body of the vehicle having the ledge $a$ and the side rail projecting above the latter, the rod H mounted within the body of the vehicle and at a point below the plane of the side rail, the seat normally resting below said hinge-rod; and the angle brackets or hinges D D' projecting upwardly from the seat and pivotally connected at their upper ends with the rod H, the hinges being provided with a projection or stop, $d$, at their pivots adapted to engage the ledge $a$, whereby the seat occupies a low position below the pivot of its hinge and below the side rail and is adapted to swing upwardly and outwardly resting upon the ledge $a$ and projecting over the side rail, substantially as and for the purpose set forth.

2. As an improvement in hinged vehicle seats, the combination, with the vehicle body having the upwardly-projecting side rail, substantially as set forth, of a seat provided with upwardly-projecting hinges, as at D', having their upper ends pivotally mounted at a point within the plane of the side rail and below the top plane of the latter, and provided with the inwardly-curved back-supports, as at I, whereby the seat normally occupies a low position below the top plane of the side rail and is adapted to swing upwardly and outwardly over the side rail; substantially as and for the purpose set forth.

JOHN CURRIER.
FREDERICK ELLIS.

Witnesses:
GEORGE H. BRIGGS,
DELL W. DOLBUR.